May 22, 1934. G. TRUBEL 1,960,130
KNIFE
Filed Oct. 6, 1932
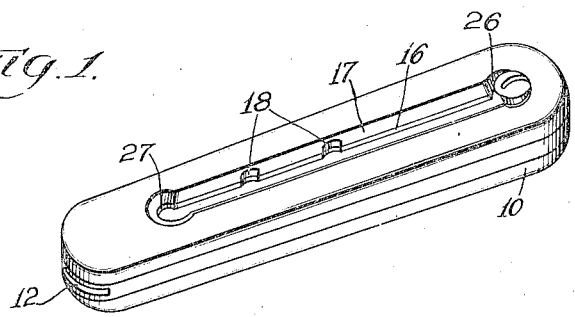
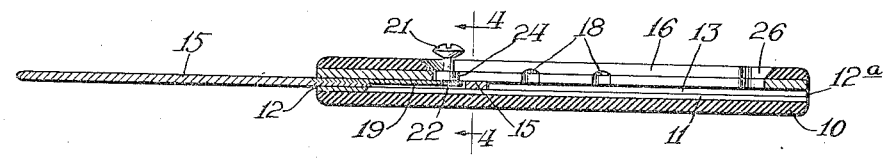
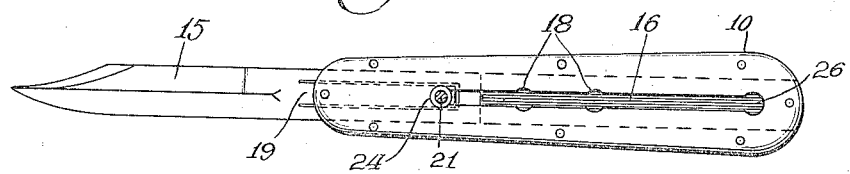
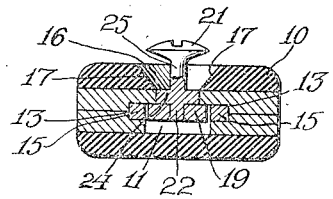
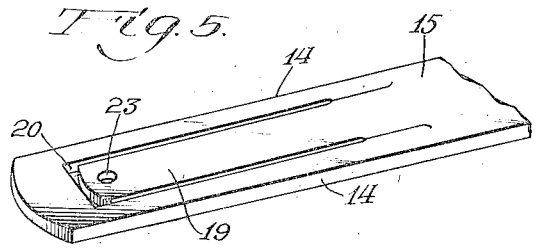
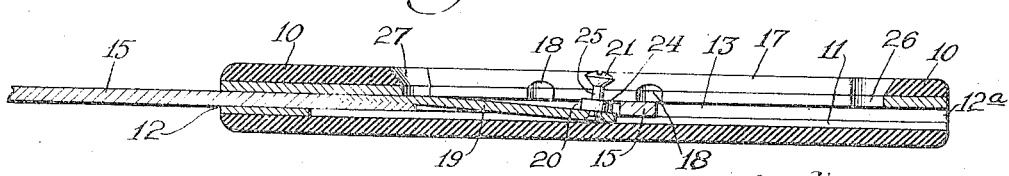
Inventor:
George Trubel,
By
Attorney Patented May 22, 1934

1,960,130

UNITED STATES PATENT OFFICE 1,960,130

KNIFE

George Trubel, Chicago, Ill.

Application October 6, 1932, Serial No. 636,467

8 Claims. (Cl. 30—10)

This invention relates to improvements in knives of the type in which the blade is slidable in the handle, adapted to be projected through one end thereof and to be retracted so that the blade will be completely housed within the handle, and one of the objects of the invention is to provide improved means for moving the blade with respect to the handle and improved means for locking the blade against movement with relation thereto and at predetermined points in its movement with respect to the handle, also for locking the blade so that it will not become accidentally projected from the handle when carrying the same in the pocket and at other times.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a perspective view of a knife of this character constructed in accordance with the principles of this invention, with the blade housed within the handle.

Figure 2 is a longitudinal sectional view, showing a blade projected to its fullest extent and through one end of the handle.

Figure 3 is a top plan view of Figure 2.

Figure 4 is a sectional view taken on line 4—4, Figure 2.

Figure 5 is a detail perspective view of one end of the blade.

Figure 6 is a longitudinal sectional view showing the blade partly projected and the method of adjusting the blade with respect to the handle.

Referring more particularly to the drawing the numeral 10 designates generally a handle which is provided with a recess 11 therein and extending lengthwise thereof, the recess opening through one end of the handle as at 12.

Guideways or grooves 13 extend along the recess 11 and project beyond the walls of the recess so as to receive the lateral edges 14 of a blade 15.

The handle is also provided with a slot 16 opening through one side thereof and this slot has communication with the recess 11. The walls 17 of the slot 16 are preferably beveled or inclined, so that the slot in the handle will be wider at the top than at the bottom to receive a portion of the thumb and for guiding the thumb along the handle.

Openings 18 are arranged in the walls of the slot and these openings are disposed opposite each other.

The blade 15 is provided with a resilient portion 19 preferably within the confines of the edges thereof and adjacent one extremity. This portion 19 may be formed in any suitable manner but preferably is formed of a separate piece of material disposed within a recess 20 in the blade and is secured to the blade by one end in any suitable manner, such as by spot welding the same.

The resilient portion 19 is preferably of a width slightly less than the width of the slot 16 so that the lateral edges of the blade 15 will be guided in the lateral grooves 13 as the blade is moved lengthwise of the handle.

Connected with the resilient portion 19 and at its free end, is a finger engaging member or latch button 21, such as a screw or the like, the extremity 22 thereof being adapted to be threaded into an opening 23 in the resilient portion 19, or otherwise secured thereto.

A shoulder or latch 24 is formed on the member or latch button 21 and this shoulder is of a diameter just slightly less than the diameter of the co-operating and oppositely disposed openings 18 in the walls of the slot 16 in the handle. The shank 25 of the finger engaging portion or latch button 21 is reduced so that it will extend through the slot 16 and the slot 16 is of a depth to serve as a protecting means for the shank of the finger engaging member 21 when the knife is carried in the pocket.

The normal tendency of the resilient portion 19 of the blade is to elevate the finger engaging member 21 so that the shoulder 24 will enter the co-operating openings 18 and thereby lock the blade against movement with respect to the handle.

When it is desired to adjust the blade in the handle, the finger engaging portion 21 is depressed to the position shown in Figure 6 and while the thumb maintains the shoulder 24 depressed so that it will pass out of the openings 18, and while the handle is grasped in the same hand, the blade 15 may be adjusted to the desired position by drawing the thumb along the slot 16, after which the finger engaging portion 21 is released, thereby permitting the resilient portion 19 of the blade to raise the shoulder 24 so that it will pass into the adjacent co-operating openings 18 and thereby lock the blade against further adjustment.

Openings 26—27, similar to the openings 18, may be arranged at both ends of the slot 16 for locking the blade within the handle or in its fully projected position.

With this improved construction it will be manifest that there is provided a simple and efficient knife in which the blade may be readily adjusted by one hand of the operator, and the blade may be projected to any desired extent with respect to the handle, according to the work which it is desired to perform with the knife.

It will also be manifest that when the blade is fully retracted it will be completely housed within the handle and the shoulder 24 of the finger engaging portion will enter the opening 26 in the opposite end of the handle to lock the blade within the handle and prevent it from becoming accidentally projected.

The handle is provided with an opening 12a in the other end thereof which communicates with the recess 11 and serves as a means to permit foreign matter which may accumulate in the recess 11, to pass therethrough and which foreign matter might otherwise prevent the complete withdrawal or retraction of the blade 15 into the handle. This opening 12a also serves as a means whereby a new blade may be inserted into the handle after the old blade has been removed, which latter may be accomplished by detaching the finger engaging piece 21.

While the preferred form of the invention has been herein shown and described, it is to be understood that various changes may be made in the details of construction and in the combination and arrangement of the several parts, within the scope of the claims, without departing from the spirit of this invention.

What is claimed as new is:—

1. A knife embodying a handle, a blade slidable therein and adapted to be projected beyond one end thereof, resilient means connected with the blade and disposed normally in a plane substantially within the confines of the faces of the blade, said means adapted to be deflected laterally beyond the plane of the faces of and with respect of the blade, there being a slot in the handle extending in a direction lengthwise thereof and decreasing in width from the outer face of the handle inward, recesses in the walls of and opening into the slot, finger engaging means connected with said resilient means extending through and conforming to the shape of said slot whereby said resilient means may be deflected and whereby the blade may be moved with respect to the said handle, and a shoulder connected with said resilient means and adapted to enter the said recesses for locking the blade against movement with respect to the handle.

2. A knife embodying a handle, a blade slidable therein and adapted to be projected beyond one end thereof, resilient means connected with the blade and disposed normally in a plane substantially within the confines of the faces of the blade, said means adapted to be deflected laterally with respect thereto, there being a slot in the handle extending in a direction lengthwise thereof, a series of longitudinally spaced recesses in the walls of and opening into the slot, finger engaging means connected with said resilient means and extending through said slot whereby said resilient means may be deflected and whereby the blade may be moved with respect to the said handle, and means connected with said resilient means adapted to enter the said recesses for locking the blade against movement with respect to the handle, the said resilient means being disposed within and spaced from the lateral edges of and extending in a general direction lengthwise of the blade whereby said blade will be guided in the handle on each side of said resilient means and throughout the entire length of the portion of the blade that is within the handle.

3. A knife embodying a handle, a blade slidable therein and adapted to be projected beyond one end thereof, resilient means connected with the blade and disposed normally within a plane substantially within the confines of the faces of the blade, said means adapted to be deflected laterally with respect thereto, there being a slot in the handle extending in a direction lengthwise thereof, a series of longitudinally spaced recesses in the walls of and opening into the slot, finger engaging means connected with said resilient means and extending through said slot whereby said resilient means may be deflected and whereby the blade may be moved with respect to the said handle, and a shoulder connected with said resilient means and adapted to enter the said recesses for locking the blade against movement with respect to the handle, the said resilient means being disposed within, extending in a general direction lengthwise of the blade and spaced from the lateral edges and the ends of said blade whereby the blade will be guided in the handle entirely around the said resilient formation and for the entire length of that portion of blade that is within the handle.

4. A knife embodying a handle, a blade slidable therein and adapted to be projected beyond one end thereof, interengaging means on the handle and blade for locking the blade in predetermined positions with respect to the handle and embodying a resilient element carried by the blade substantially within the plane of the faces of the blade and entirely encompassed by the blade, said element extending in a general direction lengthwise of the blade, a slot in the handle extending in a direction lengthwise thereof, and a finger engaging portion extending through said slot, for rendering the said resiliently yielding element inactive and also serving as a means for moving the said blade with respect to the handle whereby said knife may be held in, and the blade projected or retracted by one hand of the operator.

5. A knife embodying a handle having a groove therein opening through both ends thereof, a blade slidable in the groove and projectable through one of the open ends thereof, there being a slot opening through one face of the handle and communicating with the said groove, said slot decreasing in width from the outer face of the handle inwardly to form a guide for the thumb, a resilient element connected with the blade and movable transversely with respect to the cutting edge of the blade, said element being normally substantially disposed within the plane between the faces of the blade and entirely encompassed by the blade, a finger engaging portion connected with said resiliently yielding element, extending through and conforming to the shape of the slot for moving the blade longitudinally of the handle and for deflecting the resiliently yielding element out of said plane, and means co-operating with the said finger engaging portion for selectively locking the blade in predetermined positions with relation to the handle.

6. A knife embodying a tubular handle having a longitudinal slot therein closed at both ends, guideways within the handle and spaced from the top and bottom thereof, said guideways opening towards each other and extending lengthwise of the handle, a blade the lateral edges of which slide in said guideways, said blade being supported by the guideways above the bottom of the slot and for the entire length of the resilient element and throughout the entire length of that portion of the blade which is in the handle, and being projectable through one of the open ends of the handle, a substantially flat resilient element connected with the blade, extending in a general direction lengthwise of the blade and entirely encompassed by the blade, said element being movable laterally with respect to the blade, a finger engaging portion connected with said resiliently yielding element, extending through the slot for moving the blade longitudinally of the handle and for deflecting the resiliently yielding element, whereby the knife may be held in and the blade projected or withdrawn by one hand of the operator, and means co-operating with the said finger engaging portion for selectively locking the blade in predetermined positions with relation to the handle.

7. A knife comprising a hollow handle, a blade longitudinally slidable in said handle and adapted to be projected beyond one end thereof, said blade having a supporting shank thereon, a longitudinal aperture in said shank, spaced for an appreciable distance from the lateral edges thereof, a spring connected to said blade entirely encompassed by said shank and being substantially flush with the face planes of said shank, a latch shoulder on said spring, said handle being slotted and provided with a series of stop recesses to engage said latch shoulder, and means for releasing said spring and for moving said blade longitudinally of said handle.

8. As an article of manufacture, a blade for use in a knife of the character described, said blade comprising a body portion and a supporting shank thereon, said shank having a longitudinal aperture extending therethrough, and a spring connected to the blade and disposed within said aperture and entirely encompassed by the shank, the face of said spring being normally substantially flush with the adjacent respective faces of the shank, said spring being of a substantial length and adapted to be deflected with respect to the shank.

GEORGE TRUBEL.